United States Patent
Pinkerton et al.

(10) Patent No.: US 7,549,689 B2
(45) Date of Patent: Jun. 23, 2009

(54) TENSION-MEMBER AUTOMOTIVE DOOR TRIM PULL

(75) Inventors: John Pinkerton, Canton, MI (US); Joseph Edward Abramczyk, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 11/866,561

(22) Filed: Oct. 3, 2007

(65) Prior Publication Data

US 2009/0091153 A1    Apr. 9, 2009

(51) Int. Cl.
*B60N 3/02* (2006.01)

(52) U.S. Cl. ............... 296/1.02; 296/146.7; 296/153

(58) Field of Classification Search ............ 296/146.7, 296/1.09, 1.02, 153
See application file for complete search history.

(56) References Cited

U.S. PATENT DOCUMENTS

| | | | |
|---|---|---|---|
| 2,897,000 A | 7/1959 | Hart et al. | |
| 2,922,674 A | 1/1960 | Hollerbach | |
| 3,387,881 A | 6/1968 | Stepanek et al. | |
| 4,783,114 A | 11/1988 | Welch | |
| 5,037,687 A | 8/1991 | Kargarzadeh et al. | |
| 5,125,815 A | 6/1992 | Kargarzadeh et al. | |
| 5,173,228 A | 12/1992 | Kargarzadeh et al. | |
| 5,181,759 A | 1/1993 | Doolittle | |
| 5,868,455 A | 2/1999 | Springer et al. | |
| 6,149,224 A * | 11/2000 | Tiberia et al. | 296/146.7 |
| 6,409,249 B1 * | 6/2002 | Han | 296/146.7 |
| 2007/0024085 A1 * | 2/2007 | Steelman | 296/153 |
| 2008/0272614 A1 * | 11/2008 | Hall et al. | 296/146.7 |

* cited by examiner

*Primary Examiner*—Joseph D Pape
(74) *Attorney, Agent, or Firm*—Shook, Hardy & Bacon LLP

(57) ABSTRACT

A pull cup in a vehicle door is fitted to a door trim panel substrate and is connected to the inner door panel of the vehicle door by way of a bracket. The bracket is oriented to resist vertical loads and tension loads such that the bracket is allowed to deflect in compression loading in the event of a side impact. In one embodiment the bracket has horizontal slots through which shoulder fasteners are fitted to attach the bracket to the inner door panel. This configuration allows deflection in compression loading. In another embodiment of the bracket a pair of arms is provided between the pull cup and the inner door panel. This configuration allows buckling of the arms on compression loading.

9 Claims, 10 Drawing Sheets

Prior Art

TENSION-MEMBER AUTOMOTIVE DOOR TRIM PULL

TECHNICAL FIELD

The present invention relates generally to a support structure for the pull cup of an armrest for use with a vehicle. More specifically, the present invention relates to a support structure for a pull cup which is strong and durable under tension during normal use but which will demonstrate compromised lateral stiffness under compression in the event of a side impact.

BACKGROUND OF THE INVENTION

It is known in vehicles to provide an armrest in a door having an integrated pull cup to allow the occupant to pull the door shut. According to the known arrangement, the pull cup, typically composed of a molded plastic, is anchored to the vehicle door inner panel by a variety of stamped steel structures, the most common of which is the "L-bracket" in which the vertical portion of the bracket is attached to the inner door panel with fasteners such as screws and the horizontal portion of the bracket is attached to the underside of the pull cup with screws or clips. In addition to being anchored to the inner door panel, the pull cup is also solidly connected to the armrest substrate.

Regardless of its configuration, the primary function of the door pull cup support bracket is to transmit the force generated by the user on the door pull cup to the inner door panel to create the moment to close the door and to actuate the door latch mechanisms. The secondary function of the door pull cup support bracket is to collapse or deflect when loaded by a side impact in a manner which assists in door trim system compliance.

The known approach to anchoring the pull cup to both the vehicle door inner panel with the traditional L-bracket as well as the armrest substrate provides a good degree of lateral door function to the vehicle occupant while opening and, particularly, closing the door. However, as in so many areas of vehicle technology, there is room in the art of vehicle interior door design for an alternative configuration to known pull cup support structures which, upon vehicle inward movement of the outer door panel during a side impact, will minimize or eliminate the transfer of forces to the occupant.

SUMMARY OF THE INVENTION

The tension-member automotive door trim pull disclosed herein includes a deformable support bracket for attaching the pull cup to the inner door panel. In general, the bracket geometry disclosed herein is modified over the traditional L-bracket geometry such that vertical and tension loads used by an operator in closing the vehicle door by pulling on the pull cup are resisted while transmission of forces to the occupant in the event of a side impact are minimized or are eliminated. In one embodiment of the bracket set forth herein a "leaf spring" bracket is provided that has horizontal slots defined at its ends through which shoulder bolts or similar fasteners are fitted to attach the bracket to the inner door panel. In another embodiment of the bracket a pair of relatively straight arms is provided between the pull cup and the inner door panel. This configuration allows buckling of the arms on compression loading. The embodiment of the support bracket utilizing the straight arms can be modified such that a scissors configuration is provided, the ends of the arms attached to the inner door panel being movable by provision of elongated slots as in the first-discussed embodiment.

In yet a further embodiment of the invention a support bracket having a substantially vertical mounting flange is attached at its first end to a first portion of the inner door panel. The support bracket includes a pull cup flange that is attached to the pull cup. The substantially vertical mounting flange includes a second end opposite the first end. The second end of the substantially vertical mounting flange is positioned adjacent the outside of a second portion of the inner door panel. While providing lateral strength on closure of the door by a user, the substantially vertical mounting flange may be bent in the event of a side impact such that the second end of the substantially vertical mounting flange is distorted and moves away from the inner door panel and thus becomes spaced apart from the outside of the second portion of the inner door panel.

Still another embodiment provides a support bracket having an inner door panel attachment flange, a pull cup attachment flange, and an intermediate portion disposed between the inner door panel attachment flange and the pull cup attachment flange. A bendable bridge is provided between the intermediate portion and the pull cup attachment flange. In this embodiment in the event of a side impact the bendable bridge is bent as the pull cup attachment flange is allowed to rotate relative to the pull cup about the z-axis.

Other features of the tension-member automotive door trim pull as disclosed herein will become apparent when viewed in light of the detailed description of the preferred embodiment when taken in conjunction with the attached drawings and the appended claims.

BRIEF DESCRIPTION OF THE DRAWINGS

For a more complete understanding of the disclosed pull cup support structures, reference should now be made to the embodiments illustrated in greater detail in the accompanying drawings and described below by way of examples of the invention wherein.

DETAILED DESCRIPTION OF THE PREFERRED EMBODIMENT

Figure 1:
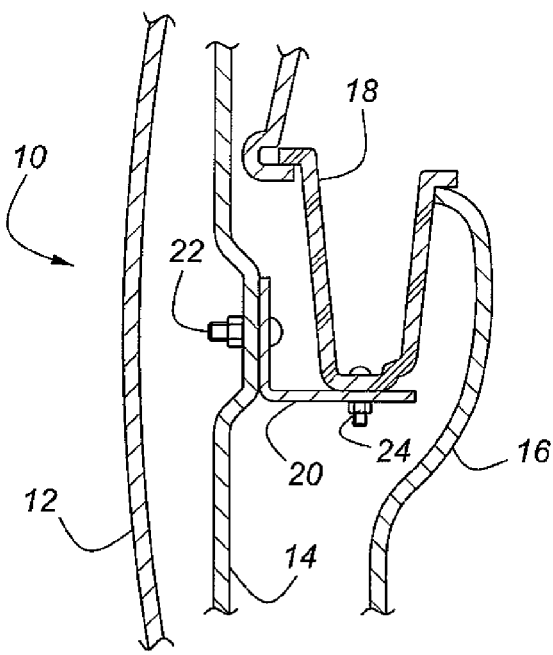
FIG. 1 illustrates a sectional view of a door assembly showing a typical door cup support bracket known in the prior art.

In the following figures, the same reference numerals will be used to refer to the same components. In the following description, various operating parameters and components are described for different constructed embodiments. These specific parameters and components are included as examples and are not meant to be limiting.

With reference first to FIG. 1, a sectional view of a door assembly, generally illustrated as 10, is shown. The door assembly 10 includes an outer door panel 12, an inner door panel 14, a door trim panel 16, and a pull cup 18 fitted in the door trim panel 16. A conventional L-bracket 20 is fastened at one end to the inner door panel 14 by a fastener 22 and at other end to the pull cup 18 by a fastener 24. The L-bracket 20 is formed from stamped sheet metal. The fastener 22 has traditionally been a screw, whereas the fastener 24 has traditionally been a screw or a clip.

Figure 2:
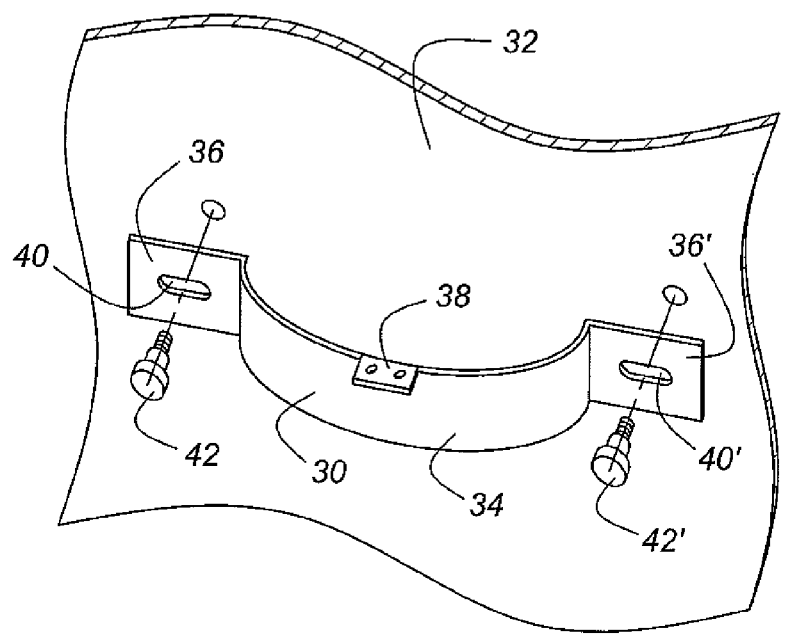
FIG. 2 illustrates a perspective view of a pull cup support bracket according to a first embodiment of the invention.

To overcome the challenges of known designs, five embodiments of an alternative arrangement are provided for connecting a pull cup to an inner door panel (also known as a door inner sheet metal component). The first of these embodiments is presented in FIGS. 2 through 5. With reference to FIG. 2, a pull cup support bracket, generally illustrated as 30, is shown in perspective view and spaced apart from an inner door panel 32. The pull cup support bracket 30 has a "leaf spring" configuration. The pull cup support bracket 30 includes a generally arcuate central portion 34 having two inner door panel attachment flanges 36 and 36'. A pull cup attachment flange 38 extends generally perpendicularly from the central portion 34 of the pull cup support bracket 30.

The attachment flange 36 includes an elongated attachment slot 40 and the attachment flange 36' includes an elongated attachment slot 40'. A shoulder bolt or similar fastener 42 is provided for attaching the pull cup support bracket 30 to the inner door panel 32 through the elongated attachment slot 40. A shoulder bolt or similar fastener 42' is provided for attaching the pull cup support bracket 30 to the inner door panel 32 through the elongated attachment slot 40'. When fixed in its assembled position, the shoulder bolt 42 is fitted generally within the distal or far end (relative to the central portion of the pull cup support bracket 30) of the elongated attachment slot 40 while the shoulder bolt 42' is fitted generally within the distal or far end of the elongated attachment slot 40'.

It should be understood that one or more of the shoulder bolts 42 and 42' as well as other fasteners discussed herein may be substituted for single detent push-pins positioned into sized holes. This arrangement would allow the fastener to unload or to pop off during compressive loading events.

Figure 3:
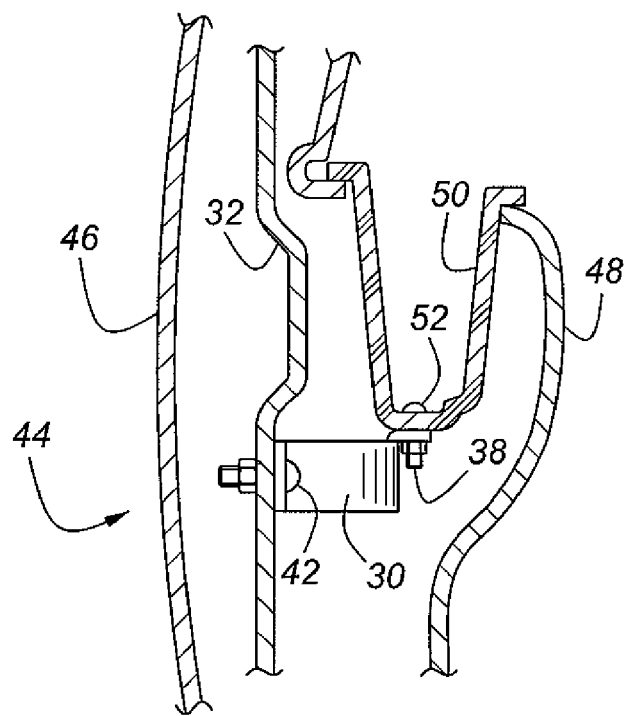
FIG. 3 illustrates a partially sectional view of a door assembly showing the first embodiment of the pull cup support bracket in place between the pull cup and the inner door panel.

A sectional view of a door assembly, generally illustrated as 44, is shown in FIG. 3. The door assembly 44 includes an outer door panel 46, the inner door panel 32, and a door trim panel 48. A pull cup 50 is provided substantially within the door trim panel 48. The pull cup support bracket 30 of the first embodiment is fitted between the pull cup 50 and the inner door panel 32. The pull cup support bracket 30 is attached to the inner door panel 32 by the shoulder bolts 42 and 42' (of which only the shoulder bolt 42 can be seen in FIG. 3), the pull cup attachment flange 38 of the pull cup support bracket 30 is attached to the pull cup 50 by a fastener 52.

Figure 4:
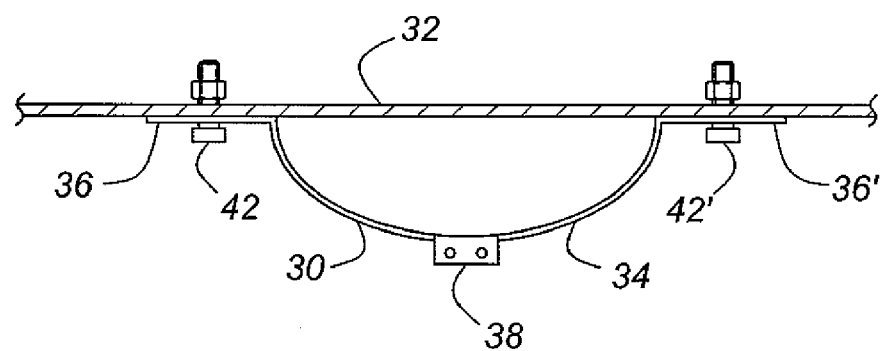
FIG. 4 illustrates a top view of the pull cup support bracket of the first embodiment and a portion of the inner door panel to which it is attached before compression.
Figure 5:
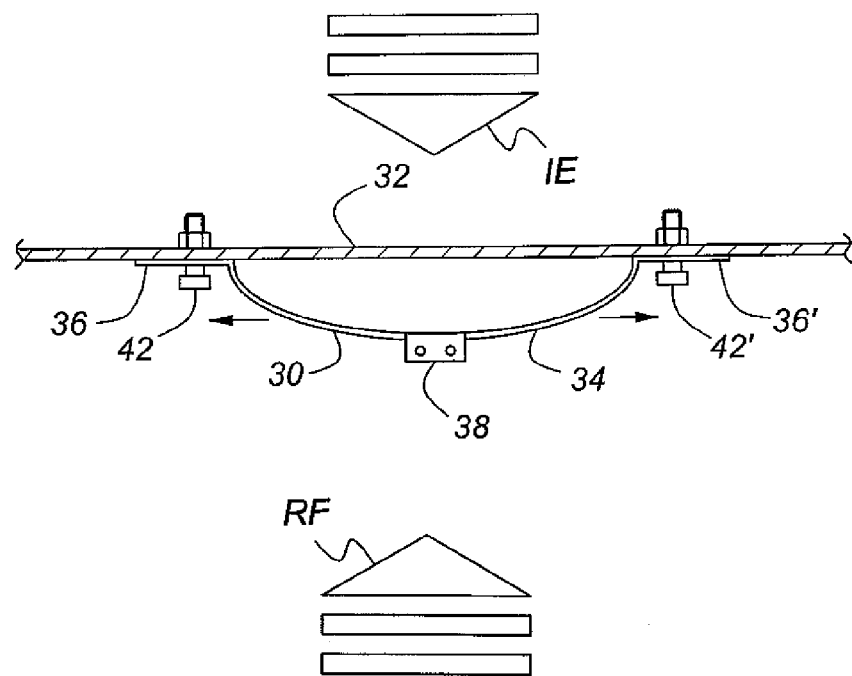
FIG. 5 illustrates the same view and embodiment as FIG. 4 but shows the pull cup support bracket of the first embodiment after lateral compression.

A top view of the pull cup support bracket 30 is illustrated in FIG. 4 in which the pull cup support bracket 30 is fastened to the inner door panel 32. The configuration of the pull cup attachment flange 38 is clearly shown in this view. In the event of a side or lateral impact on the vehicle door, the inner door panel 32 is pushed vehicle inward by lateral force in the form of impact energy IE as illustrated in FIG. 5. As shown, the central portion 34 of the pull cup support bracket 30 is compressed and the inner door attachment flanges 36 and 36' are spread away from each other, such movement being allowed by the elongated slots 40 and 40' with respect the shoulder bolts 42 and 42' respectively fastened therethrough. On impact the occupant provides resistive force RF. However, according to the disclosed arrangement, the force of the impact energy IE is substantially or entirely transmitted away from the occupant. Particularly, as illustrated, while the inner door panel 32 has been moved vehicle inward upon application of the impact energy IE and while the pull cup support bracket 30 is compressed, the position of the pull cup attachment flange 38 (and thus the position of the pull cup 50 [shown in FIG. 3 but not shown in FIGS. 4 and 5]) is substantially unchanged.

Figure 6:
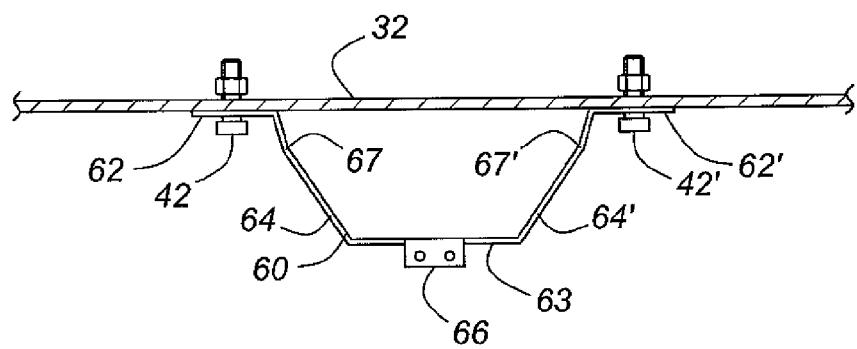
FIG. 6 illustrates a top view of a pull cup support bracket according to the second embodiment of the invention and a portion of the inner door panel to which it is attached before compression.
Figure 7:
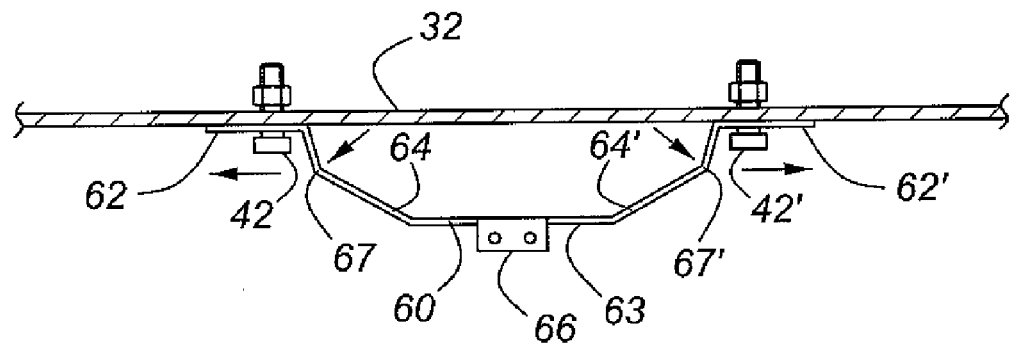
FIG. 7 illustrates the same view and embodiment as FIG. 6 but shows the pull cup support bracket of the second embodiment after lateral compression.

The second embodiment of the pull cup support bracket set forth herein is shown in FIGS. 6 and 7. With respect to FIG. 6, a pull cup support bracket 60 having inner door attachment flanges 62 and 62' is attached to the inner door panel 32 by shoulder bolts 42 and 42'. It is to be understood that the inner door attachment flanges 62 and 62' may have the same elongated slots 40 and 40' as set forth above with respect to the first embodiment of the pull cup support bracket disclosed herein. However, in addition to or in lieu of the movement made possible by the elongated slots, the pull cup support bracket 60 has an endpiece 63 and a pair of bendable legs 64 and 64' which extend respectively between the attachment flanges 62 and 62' and the endpiece 63. The pull cup support bracket 60 further includes a pull cup attachment flange 66 extending vehicle outward from the endpiece 63 to be connected to the pull cup. In addition, the bendable leg 64 is provided with a bend initiator area 67 and the bendable leg 64' is provided with a bend initiator area 67'. The initiator areas 67 and 67' may be formed by a variety of methods including a channel (not shown) formed on one or both sides of each of the legs 64 and 64'. The channels are formed perpendicular to the long axis of the pull cup support bracket 60.

Upon a side impact of the vehicle caused by a impact energy IE as shown in FIG. 7, the bendable legs 64 and 64' buckle outwardly as illustrated at the initiator areas 67 and 67'. If fitted with elongated slots, the inner door attachment flanges 62 and 62' are forced outwardly also as illustrated. Accordingly, while the inner door panel 32 is pushed inward and the legs 64 and 64' of the pull cup support bracket 60 buckle at the initiator areas 67 and 67', the pull cup attachment flange 66 remains generally in its initial position and vehicle-inward movement of the pull cup attachment flange 66 is prevented.

Figure 8:
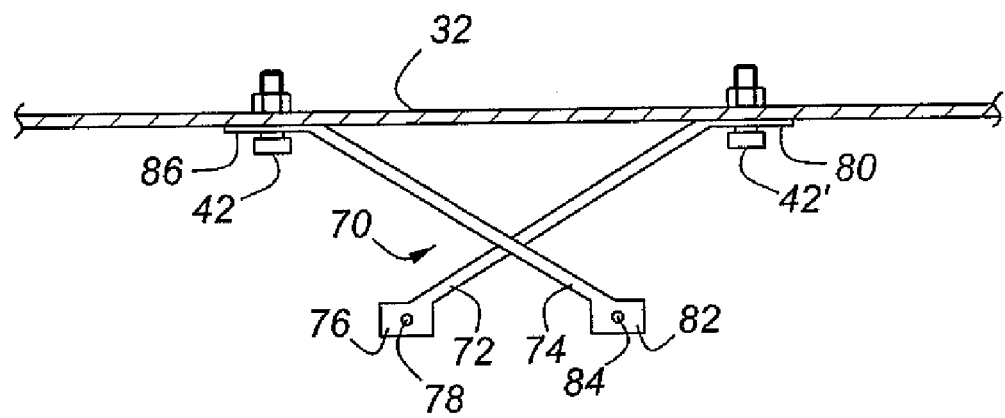
FIG. 8 illustrates a top view of a pull cup support bracket according to the third embodiment of the invention and a portion of the inner door panel to which it is attached before compression.
Figure 9:
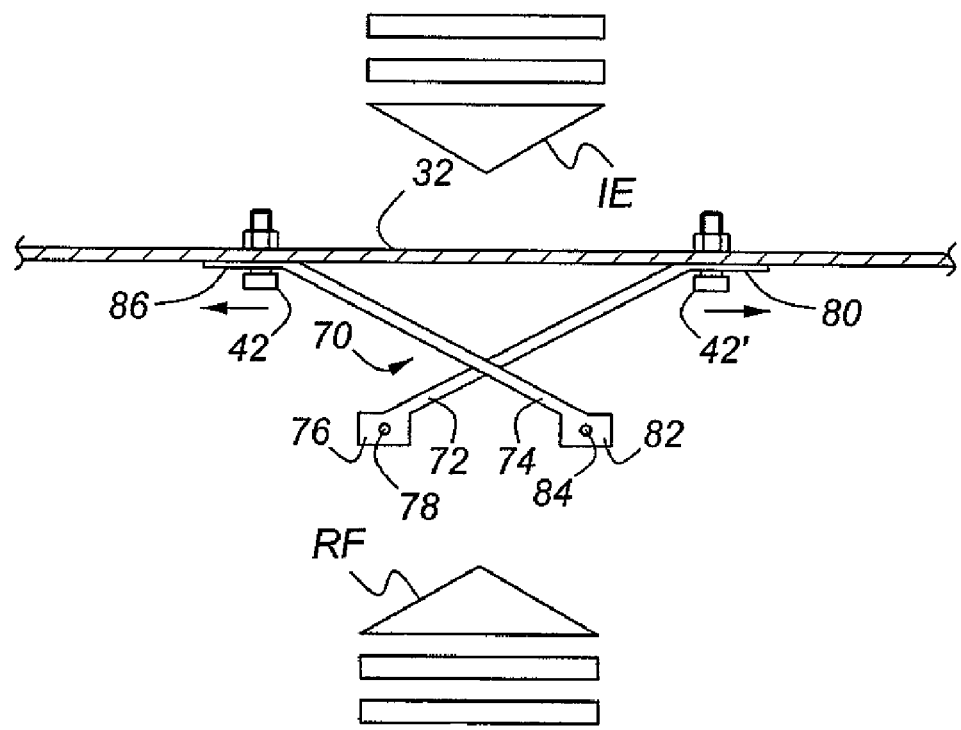
FIG. 9 illustrates the same view and embodiment as FIG. 8 but shows the pull cup support bracket of the third embodiment after lateral compression.

A further variation of the pull cup support bracket of the present invention is illustrated in FIGS. 8 and 9 in which the third embodiment of the pull cup support bracket, generally illustrated as pull cup support bracket assembly 70, is comprised of a first leg 72 and a second leg 74. The first leg 72 includes a pull cup attachment flange 76 having a hole 78 for a pull cup fastener (not shown) at a first end and an inner door attachment flange 80 at its other end. An elongated slot like the slot 40 of the pull cup support bracket 30 is defined in the inner door attachment flange 80. The second leg 74 includes a pull cup attachment flange 82 having a hole 84 for a pull cup fastener (not shown) at a first end and an inner door attachment flange 86 at its other end. An elongated slot like the slot 40 of the pull cup support bracket 30 is defined in the inner door attachment flange 86. The inner door attachment flange 76 is attached to the inner door panel 32 by the shoulder bolt 42. The inner door attachment flange 86 is attached to the inner door panel 32 by the shoulder bolt 42'. Both the pull cup attachment flange 76 and the pull cup attachment flange 82 are pivotably attached to the pull cup by fasteners.

In the event of a side impact by an impact energy IE shown in FIG. 9, the inner door panel 32 is moved inward while the inner door attachment flange 80 and the inner door attachment flange 86 both are moved outward as allowed by the travel of the shoulder bolts 42 and 42' in the elongated slots. As set forth above with respect to the arrangement of FIG. 5, the resistive force RF is provided by the vehicle occupant while the force of the impact energy IE is substantially or entirely transmitted away from the occupant. Particularly, the pull cup attachment flange 76 and the pull cup attachment flange 82 are allowed to pivot as needed on the pull cup to allow movement of the first leg 72 and the second leg 74. However, the pull cup is moved vehicle inward little if at all upon application of the impact energy IE, thereby reducing or minimizing the transfer of energy to the occupant.

Figure 10:
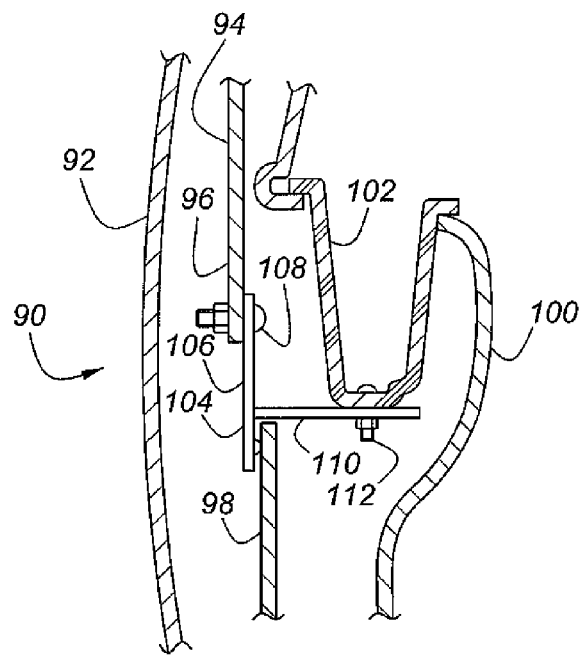
FIG. 10 illustrates a partially sectional view of a door assembly which includes a support bracket fitted between the pull cup and the inner door panel, the support bracket representing the fourth embodiment of the present invention, the door assembly being illustrated before a side impact to the vehicle door.
Figure 11:
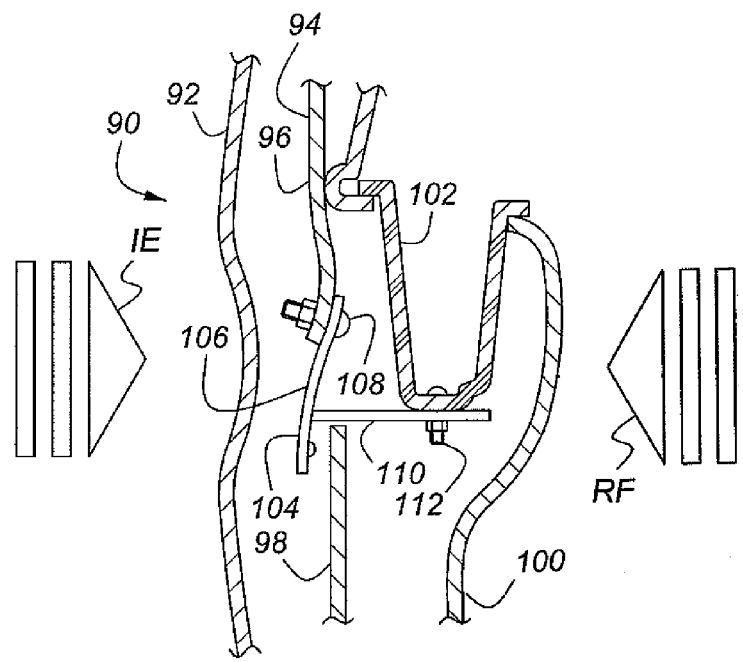
FIG. 11 illustrates substantially the same view as shown in FIG. 10 but shows the door assembly after side impact to the vehicle door.
Figure 12:
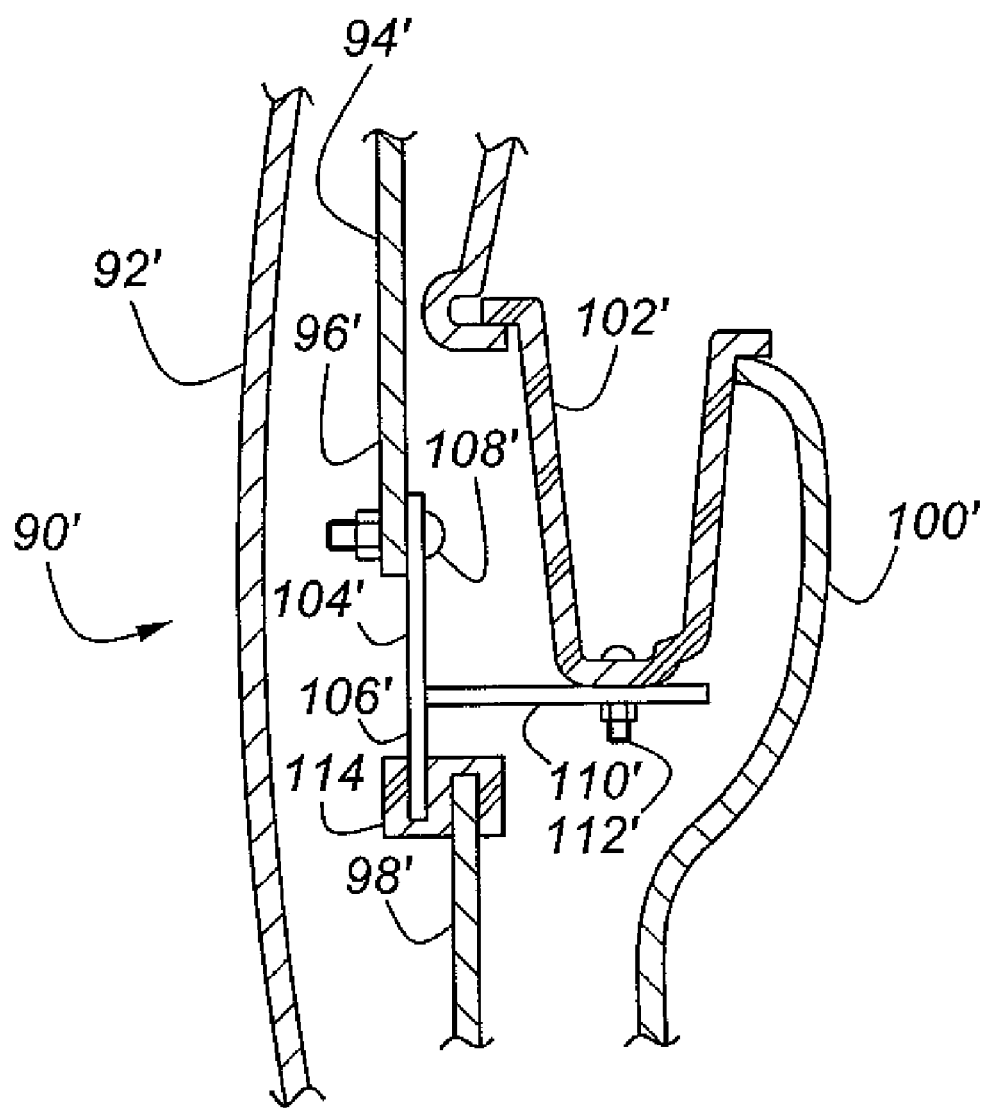
FIG. 12 illustrates a partially sectional view of a door assembly in which a variation of the fourth embodiment of the invention is provided whereby a frangible clip is fitted between the pull cup support bracket and a portion of the inner door panel.

As a variation of the pull cup support brackets shown in FIGS. 2 through 9 and as represented by the three embodiments set forth above, FIGS. 10 through 12 illustrate a fourth embodiment of the pull cup support bracket of the instant disclosure. With respect first to FIG. 10, a sectional view of a door assembly, generally indicated as 90, is shown. The door assembly 90 includes an outer door panel 92, an inner door panel 94 having an upper portion 96 and a lower portion 98, and a door trim panel 100. A pull cup 102 is substantially disposed within the door trim panel 100. A pull cup support bracket 104 is provided and includes a substantially vertical portion 106 that is attached at its upper end to the upper portion 96 by a fastener 108 and a substantially horizontal portion 110 that is attached to the pull cup 102 by a fastener 112.

The inner door panel 94 is preferably an integral piece and the upper portion 96 and the lower portion 98 define portions which are spaced apart such that an aperture is provided in which a portion of the vertical portion 106 of the pull cup support bracket 104 is provided. Specifically, the lower end of the vertical portion 106 extends vehicle outward of the lower portion 98 of the inner door panel 94 and is in contact with the outer side of the lower portion 98. In this manner the pull cup support bracket 104 provides the necessary structure when in tension, that is, when the user pulls the vehicle door shut using the pull cup 102.

When the vehicle is impacted by impact energy IE as illustrated in FIG. 11, the outer door panel 92 is pushed vehicle inward, as is the inner door panel 94. As illustrated, the impact energy IE causes the vertical portion 106 of the pull cup support bracket 104 to be bent on compression. The pull cup support bracket 104 and the door trim panel 100 thus are not substantially displaced in spite of the impact energy IE while the impact energy IE is transmitted away from the occupant who provides a resistive force RF.

A variation of the embodiment of the pull cup support bracket 104 provided in FIGS. 10 and 11 is illustrated in FIG. 12 in which a sectional view of a door assembly, generally illustrated as 90', is shown. The door assembly 90' includes an outer door panel 92', an inner door panel 94' having an upper portion 96' and a lower portion 98', and a door trim panel 100'. A pull cup 102' is substantially disposed within the door trim panel 100'. A pull cup support bracket 104' is provided and includes a substantially vertical portion 106' that is attached at its upper end to the upper portion 96' by a fastener 108' and a substantially horizontal portion 110' that is attached to the pull cup 102' by a fastener 112'. As set forth above with respect to the embodiment shown in FIGS. 10 and 11, the inner door panel 94' is preferably an integral piece and the upper portion 96' and the lower portion 98' define portions which are spaced apart such that an aperture is provided in which a portion of the vertical portion 106' of the pull cup support bracket 104' is fitted.

The embodiment shown in FIG. 12 includes a frangible clip 114 that connects the lower end of the vertical portion 106' of the pull cup support bracket 104' and the upper end of the lower portion 98' of the inner door panel 94'. The frangible clip 114 is made of a polymerized material such as a plastic. A notch 116 is defined in the frangible clip 114 between the lower end of the vertical portion 106' and the upper end of the lower portion 98'. On application of a lateral force against the vehicle door 90', the vertical portion 106' is bent such that the frangible clip 114 is broken into two pieces, allowing distortion of the pull cup support bracket 104' in a fashion similar to that shown in FIG. 11.

Figure 13:
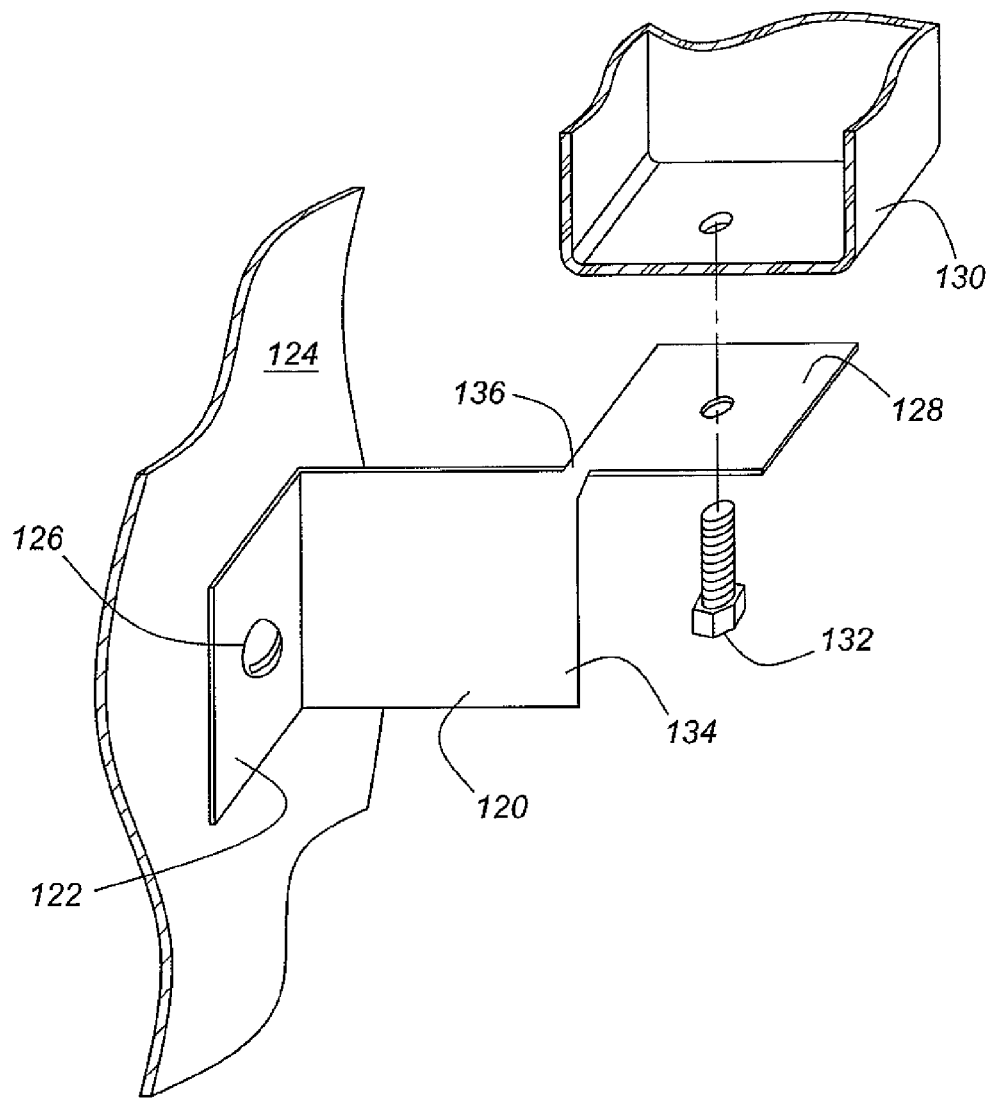
FIG. 13 illustrates a partially exploded view of a pull cup bracket attached to a portion of the inner door panel of a door assembly and positioned adjacent a pull cup, shown in partial view, the pull cup bracket being a fifth embodiment of the invention.
Figure 14:
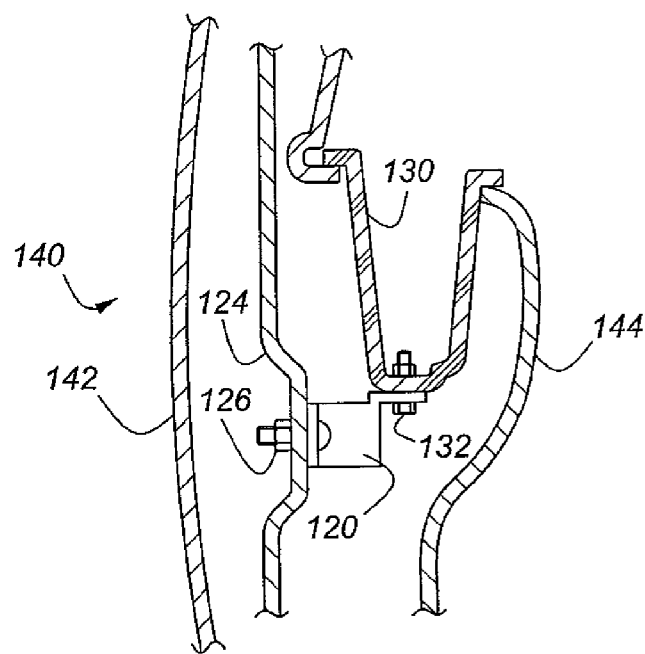
FIG. 14 is a partially sectional view of a door assembly in which the fifth embodiment of the pull cup bracket is fitted, the door assembly being illustrated before a side impact to the vehicle door.
Figure 15:
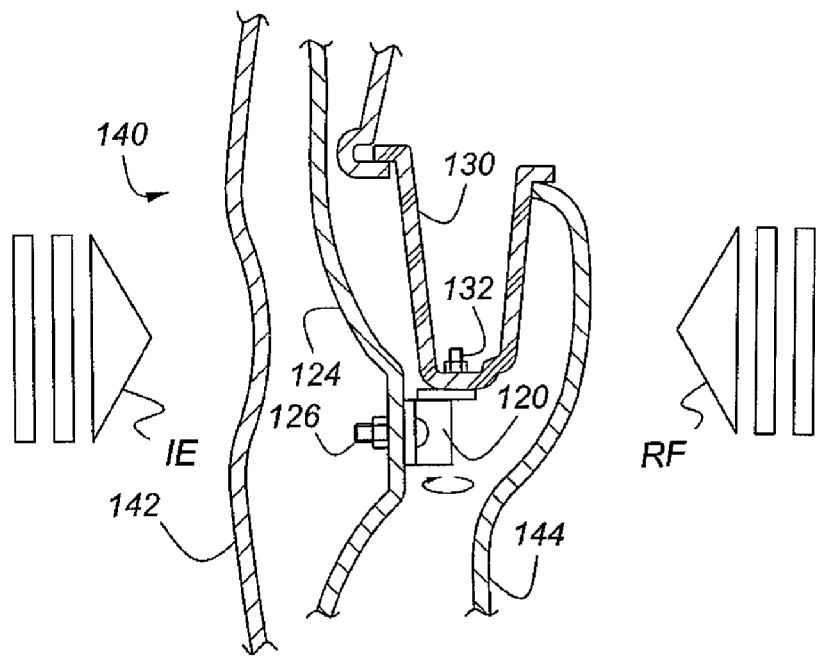
FIG. 15 is a view similar to that of FIG. 14 but the door assembly after a side impact to the vehicle door.
Figure 16:
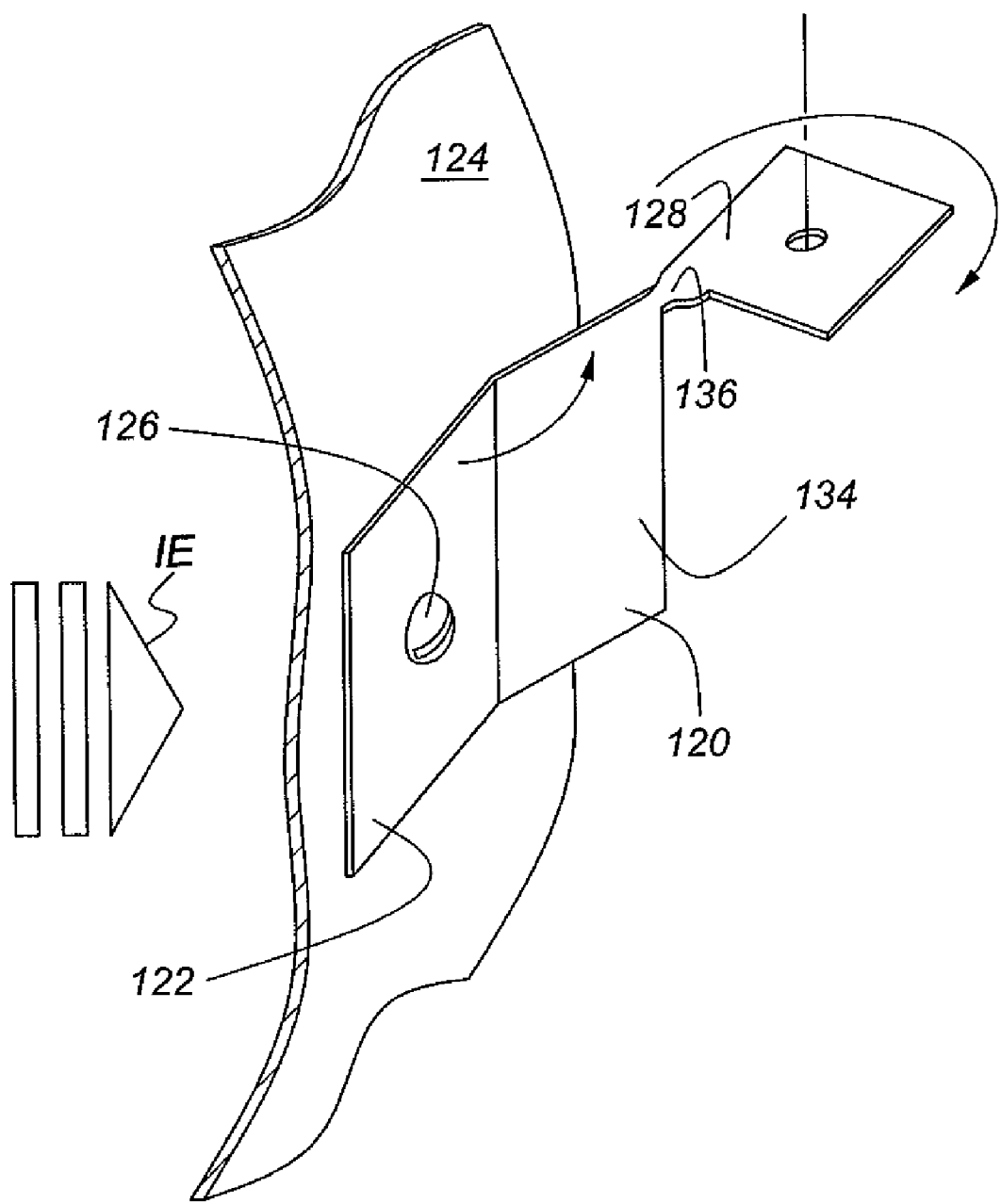
FIG. 16 is a view similar to that of FIG. 13 but illustrating the support bracket as it would appear following a side impact event.

A fifth embodiment of the pull cup bracket is shown in FIGS. 13 through 16 in which a pull cup bracket 120 is provided. The bracket 120 may be formed from metal or from a plastic. The pull cup bracket 120 includes an inner door panel mounting flange 122 which is attached to an inner door panel 124 (of which only a portion is shown in FIGS. 13 and 16) by a fastener 126, a pull cup mounting flange 128 which is mounted to a pull cup 130 by a fastener 132. The fastener 132 is preferably a shoulder bolt but any fastener that would allow rotation of the pull cup mounting flange 128 with respect to the pull cup 130 would be suitable for this purpose.

An intermediate portion 134 is provided between the inner door panel mounting flange 122 and the pull cup mounting flange 128. The intermediate portion 134 is attached to the inner door panel mounting flange 122 along a pin joint. A bendable bridge 136 is provided between the intermediate portion 134 and the pull cup mounting flange 128.

The pull cup support bracket 120 is shown in its installed position in FIGS. 14 and 15 in which a door assembly, generally illustrated as 140, is provided. The door assembly 140 includes an outer door panel 142, the inner door panel 124, a door trim panel 144, the pull cup 130, and the pull cup support bracket 120. The door assembly 140 is shown in FIG. 14 as being in its state prior to side impact. In FIG. 15, the door assembly 140 is shown after side impact. In this figure, impact energy IE has been applied to the door assembly 140 causing the outer door panel 142 and the inner door panel 124 to be pushed vehicle inward. The occupant provides a resistive force RF. As the inner door panel mounting flange 122 is pushed vehicle inward, the intermediate portion 134 pushes upon the bendable bridge 136 which, as illustrated in FIG. 16, effects rotation of the pull cup mounting flange 128 about the z-axis on the fastener 132, thus preventing the pull cup mounting flange 128 from being moved vehicle inward while the impact energy IE is transmitted away from the occupant. During the vehicle inward movement of the inner door panel mounting flange 122 the intermediate portion 134 bends along the pin joint and tends to flatten out toward the inner door panel 124, as illustrated in FIG. 16.

The foregoing discussion discloses and describes exemplary embodiments of pull cup support bracket of the instant disclosure. One skilled in the art will readily recognize from such discussion, and from the accompanying drawings and claims that various changes, modifications and variations can be made therein without departing from the true spirit and fair scope of the invention as defined by the following claims.

What is claimed is:

1. A door assembly for use in a vehicle, the door assembly comprising:
    a pull cup;
    an inner door panel;
    a support bracket having a pull cup flange and a pair of arms, each of said pair of arms terminating in a inner door panel flange, said arms extending from said pull cup flange, each of said inner door panel flanges having an elongated slot defined therein; and
    fasteners to attach each of said inner door panel flanges to said inner door panel.

2. The door assembly of claim 1 wherein each of said elongated slots has a width and wherein each of said fasteners has a shoulder, said shoulder having a width, said width of said elongated slot being greater than said width of said shoulder.

3. The door assembly of claim 1 wherein said fasteners are shoulder-type fasteners.

4. The door assembly of claim 1 wherein each of said arms is arcuate.

5. The door assembly of claim 1 wherein each of said arms is substantially straight.

6. The door assembly of claim 1 wherein said support bracket includes two pull cup flanges, one of said two pull cup flanges being attached to one of said arms and the other of said two pull cup flanges being attached to the other of said arms.

7. The door assembly of claim 6 wherein said arms and said pull cup flanges are separate.

8. The door assembly of claim 6 wherein each of said two pull cup flanges includes a single attachment point for attachment to said pull cup.

9. The door assembly of claim 8 wherein each of said two pull cup flanges is rotatably attached to said pull cup.

* * * * *